US012605700B2

(12) United States Patent
Stockwell et al.

(10) Patent No.: US 12,605,700 B2
(45) Date of Patent: Apr. 21, 2026

(54) PHOSPHORUS STABILIZED ZEOLITES

(71) Applicant: BASF CORPORATION, Florham Park, NJ (US)

(72) Inventors: David M. Stockwell, Iselin, NJ (US); Michelle Scamporino, Iselin, NJ (US); Alvaro Gordillo Bolonio, Barcelona (ES)

(73) Assignee: BASF CORPORATION, Florham Park, NJ (US)

( * ) Notice: Subject to any disclaimer, the term of this patent is extended or adjusted under 35 U.S.C. 154(b) by 519 days.

(21) Appl. No.: 18/030,045

(22) PCT Filed: Oct. 8, 2021

(86) PCT No.: PCT/US2021/054218
§ 371 (c)(1),
(2) Date: Apr. 3, 2023

(87) PCT Pub. No.: WO2022/076850
PCT Pub. Date: Apr. 14, 2022

(65) Prior Publication Data

US 2023/0398525 A1     Dec. 14, 2023

Related U.S. Application Data

(60) Provisional application No. 63/089,665, filed on Oct. 9, 2020.

(51) Int. Cl.
*B01J 29/70*     (2006.01)
*B01J 29/85*     (2006.01)
*B01J 37/28*     (2006.01)

(52) U.S. Cl.
CPC .......... *B01J 29/7007* (2013.01); *B01J 29/85* (2013.01); *B01J 37/28* (2013.01); *B01J 2229/30* (2013.01)

(58) Field of Classification Search
CPC .... B01J 29/7007; B01J 29/85; B01J 37/0045; B01J 37/28; B01J 2229/183;
(Continued)

(56) References Cited

U.S. PATENT DOCUMENTS 3,972,832 A * 8/1976 Butter .................. C10G 35/095
585/533
2007/0173399 A1 7/2007 Lau et al.
(Continued)

FOREIGN PATENT DOCUMENTS

CN     103842078 A     6/2014
CN     105813740 A     7/2016

OTHER PUBLICATIONS

Costa, et al., "BEA and MOR as additives for light olefins production", Applied Catalysis A: General, vol. 319, Mar. 1, 2007, pp. 137-143.
(Continued)

*Primary Examiner* — Brian A McCaig
(74) *Attorney, Agent, or Firm* — Peter DiMauro

(57)     ABSTRACT

Disclosed herein are phosphated low silica to alumina ratio (SAR) zeolites and methods of formation and stabilization thereof to minimize complete de-alumination of tetrahedral framework aluminum. Also disclosed herein are catalyst compositions, catalyst components, adsorbents, and ion exchange materials including said phosphated low SAR zeolites, methods of formation thereof, and methods of use thereof.

17 Claims, 1 Drawing Sheet

(58) Field of Classification Search

CPC .......................... B01J 2229/24; B01J 2229/30; B01J 2229/37; B01J 2229/42; C10G 11/05; C10G 11/18

See application file for complete search history.

(56) References Cited

U.S. PATENT DOCUMENTS

| | | |
|---|---|---|
| 2013/0023710 A1 | 1/2013 | Ravichandran et al. |
| 2014/0194662 A1 | 7/2014 | Nesterenko et al. |
| 2015/0174559 A1 | 6/2015 | Smith et al. |

OTHER PUBLICATIONS

European Search Report for EP Patent Application No. 21878637.4, Issued on Sep. 13, 2024, 2 pages.

International Search Report and Written Opinion of International Application No. PCT/EP2021/054218 mailed Jan. 31, 2022, 9 pgs.

Danisi et al., "Revealing long- and short-range structural modifications within phosphorus-treated HZSM-5 zeolites by atom probe tomography, nuclear magnetic resonance and powder X-ray diffraction", Physical Chemistry Chemical Physics, Aug. 23, 2018, vol. 20, pp. 27766-27777.

Louwen et al., "Understanding the Activation of ZSM-5 by Phosphorus: Localizing Phosphate Groups in the Pores of Phosphate-Stabilized ZSM-5", Chemistry of Materials, Oct. 19, 2020, vol. 32, Issue 21, pp. 9390-9403.

Van Der Bij et al., "Local silico-aluminophosphate interfaces withint phosphated H-ZSM-5 zeolites", Physical Chemistry Chemical Physics, Dec. 18, 2013, vol. 16, pp. 9892-9903.

Van Der Bij et al., "Phosphorus promotion and poisoning in zeolite-based materials: synthesis, characterisation and catalysis", Chemical Society Reviews, Jun. 5, 2015, vol. 44, pp. 7406-7428.

* cited by examiner

PHOSPHORUS STABILIZED ZEOLITES

CROSS-REFERENCE TO RELATED APPLICATION(S)

This application claims the benefit of priority of U.S. Provisional Patent Application No. 63/089,665, filed on Oct. 9, 2020, the disclosure of which is hereby incorporated by reference herein in its entirety.

FIELD OF THE DISCLOSURE

The present disclosure relates to phosphorus stabilized zeolites, methods of preparation thereof, and methods of use thereof.

BACKGROUND

FCC is the main source of world's butylenes production. Almost half of the butylenes production is sourced from FCC units, and more than 40% of it is consumed to make high octane blending components via alkylation units. Due to increasing demand for improved fuel efficiency, more and more refiners find it profitable to increase butylenes in their units. However, conventional olefin maximization additives based on ZSM-5 alone are not sufficient to meet this target. ZSM-5 additives are designed to make propylene; thus, they make more propylene over butylenes. When the units are wet-gas compressor limited the use of ZSM-5 will increase propylene more than butylenes, thus reaching the liquefied petroleum gas (LPG) limit or other constraints before reaching the required butylenes yields. In such a scenario the unit needs a catalyst (or additive) solution which contributes to increased butylenes/propylene (C4=/C3=) ratio compared to ZSM-5.

Beta zeolite delivers butylenes more selectively than ZSM-5. However, beta zeolite is less active than ZSM-5 and is more expensive than ZSM-5, making the use of beta zeolite cost prohibitive in most instances. It is believed that by using a beta zeolite with more active sites (i.e., more framework aluminum with available acid sites and low silica to alumina ratio), the activity of beta zeolite can be improved, the dose or loading of beta zeolite for attaining a certain amount of butylenes can be reduced, and the cost associated with using beta zeolite can be mitigated. However, it is believed that low silica to alumina ratio (SAR) zeolites, such as, without limitations, a template free low SAR beta zeolite, are less stable in steam or strong acid. There is thus a need to develop stable, low SAR zeolites, and methods for preparation thereof.

While such zeolites could be utilized for FCC applications, they could also be useful in many other applications including, without limitations, other catalytic processes (besides FCC), as adsorbents, ion exchange materials, and so on.

SUMMARY

In certain embodiments, the present disclosure provides a zeolite including a phosphated low SAR zeolite in which at least about 40%, at least about 45%, at least about 50%, at least about 60%, at least about 70%, at least about 80%, or at least about 90% of the framework aluminum remains substantially intact and/or is not completely de-aluminated after phosphorus stabilization and/or after exposure to harsh conditions (such as low pH, high temperature and/or high moisture content). In certain embodiments, at least about 40%, at least about 45%, at least about 50%, at least about 60%, at least about 70%, at least about 80%, or at least about 90% of the framework aluminum remains substantially intact and/or is not completely de-aluminated after phosphorus stabilization but before steaming. In certain embodiments, the present disclosure provides a zeolite including a phosphated low SAR zeolite in which the P/Al molar ratio ranges from about 0.2 to about 0.9.

The term "low SAR zeolite," as used herein, refers to a zeolite with a SAR lower than about 30, lower than about 28, lower than about 25, lower than about 20, or lower than about 15. In certain embodiments the methods and compositions described herein encompass zeolites having a SAR of 30 or greater, e.g., a SAR ranging from about 5 to about 150, about 10 to about 100, or about 15 to about 50, about 30 to about 150, about 30 to about 100, or about 30 to about 50, or any sub-range or single SAR value therein.

The term "substantially intact," as used herein, refers to at least two out four bonds in a tetrahedral framework aluminum remaining intact as Al—O—Si bonds, such that the aluminum remains chemically bound to the tetrahedral framework rather than completely de-aluminated or chemically detached from the tetrahedral framework.

The term "completely de-aluminated" or "bulk de-alumination" are used interchangeably throughout the description. These terms refer to aluminum that is fully chemically detached from the zeolite framework such that it is no longer chemically bound and can be separated from the zeolite through physical means (e.g., filtration). The term "completely de-aluminated" or "bulk de-alumination" should be distinguished from partially de-aluminated (or partially hydrolyzed) aluminum, also referred to herein as "partially dislodged tetrahedral framework aluminum" ($Al_{Td}$), which remains chemically bound to the zeolite framework, is available to bind phosphorus, cannot be separated from the zeolite framework by physical means (e.g., filtration), and can be detected via, e.g., NMR. The term "completely de-aluminated" or "bulk de-alumination" should also be distinguished from octahedral non-framework aluminum, which may be formed when bulk de-alumination is minimal, yet is believed to not be substantially intact (as defined hereinabove) because it is believed to not be chemically bound to the zeolite framework through bonds with framework —O—$Si_T$—. Instead it may be in the form of a cation associated with framework Al, or occur as neutral clusters in the micropores. Octahedral aluminum can also be detected via NMR.

The term "chemically bound," as used herein, means that the aluminum cannot be separated through physical means (e.g., filtration).

Exemplary zeolites that may be encompassed by the instant disclosure include, without limitations, zeolites with the structure BEA (e.g., beta zeolite), MSE, -SVR, FAU (e.g., zeolite Y), MOR, CON, SOF, MFI (e.g., ZSM-5), IMF, FER, MWW, MTT, TON, EUO, MRE, NAT, CHA, or a combination thereof. In certain embodiments, zeolites that may be encompassed by the instant disclosure include, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-11 interme-diates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34. In certain embodiments, zeolites that may be encompassed by the instant disclosure include, without limitations, zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilo-lite, gmelinite, phillipsite and faujasite.

In embodiments, the low SAR zeolites may have an $Al_2O_3$ concentration of greater than about 4 wt %, greater than about 8 wt %, greater than about 10 wt %, greater than about 12 wt %, greater than about 15 wt %, greater than about 20 wt %, or greater than about 25 wt %, based on total weight of the zeolite.

In embodiments, the P/Al molar ratio of the low SAR zeolites may be greater than about 0.2, greater than about 0.3, greater than about 0.5, or greater than about 0.7.

In embodiments, the phosphated low SAR zeolites described herein maintain at least about 75%, at least about 80%, at least about 85%, or at least about 90% of their crystallinity after steaming (as may be assessed by compar-ing the steamed zeolite surface area (SZSA) to the zeolite surface area prior to steaming (ZSA)).

Any of the zeolites described herein may be formulated with additional constituents, such as, a non-zeolitic matrix or a substrate, in order to form a catalyst component, and adsorbent, or an ion exchange material for use in a variety of catalytic processes, adsorption processes, and the like.

In certain embodiments, the present disclosure provides a process for forming a phosphated zeolite. The process includes performing condensation of a phosphate source onto a partially dislodged tetrahedral framework aluminum ($Al_{Td}$) of a zeolite with substantially no complete de-alumi-nation of the framework.

The term "partially dislodged tetrahedral framework alu-minum" ($Al_{Td}$), as used herein, refers to at least one out four Al—O—Si bonds (but no more than three Al—O—Si bonds) in a tetrahedral framework aluminum being chemi-cally detached while the remaining Al—O—Si bonds remaining intact, such that the aluminum remains partially chemically bound to the framework rather than completely chemically detached from the framework.

A variety of phosphate sources may be condensed onto the zeolite, e.g., via titration. In one embodiment, the phosphate source is phosphoric acid.

In certain embodiments, performing condensation of a phosphate source includes titrating the phosphate source at a rate effective to maintain a pH within a target pH titration range, such as, from about 2.2 to about 3.7, from about 2.2 to about 3.5, from about 2.2 to about 3.3, from about 2.2 to about 3.0, from about 2.25 to about 2.7, or from about 2.3 to about 2.4.

In embodiments, performing condensation of a phosphate source occurs at a target temperature, such as, from about 25° C. to about 150° C., from about 40° C. to about 120° C., from about 45° C. to about 100° C., or from about 50° C. to about 80° C.

In certain embodiments, the instant disclosure provides for a process of forming a catalyst component, a process for forming an adsorbent, and a process for forming an ion exchange material by combining any of the phosphated zeolites (e.g., phosphated low SAR zeolites) described herein with one or more suitable constituents, such as a non-zeolitic matrix or a substrate.

In certain embodiments, the instant disclosure encom-passes a FCC catalyst composition that includes a catalyst component including any of the phosphate stabilized zeo-lites described herein and a non-zeolitic matrix (a first component) and a second component that is compositionally different from the first component and may include a zeolite selected from zeolites with the structure BEA (e.g., beta zeolite), MSE, -SVR, FAU (e.g., zeolite Y), MOR, CON, SOF, MFI (e.g., ZSM-5), IMF, FER, MWW, MTT, TON, EUO, MRE, NAT, CHA, or a combination thereof. In certain embodiments, the second component may include zeolites such as, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metalloalumino-phosphate MAPO-36, aluminophosphate VPI-5, or mes-oporous crystalline material MCM-41; REUSY, zeolite X, zeolite Y, de-aluminated zeolite Y, silica-enriched de-alumi-nated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34. In certain embodiments, the second component may include zeolites such as, without limita-tions, zeolite A, zeolite B, zeolite F, zeolite H, zeolite K-G, zeolite L, zeolite M, zeolite Q, zeolite R, zeolite T, morden-ite, erionite, offretite, ferrierite, chabazite, clinoptilolite, gmelinite, phillipsite and faujasite.

In certain embodiments, the instant disclosure encom-passes a FCC catalyst component that includes any of the phosphate stabilized zeolites described herein in combina-tion with any of the zeolites listed hereinabove and a non-zeolitic matrix.

In certain embodiments, the instant disclosure encom-passes a method of cracking a hydrocarbon feed by contact-ing a feed with any of the FCC catalyst compositions described herein.

In one aspect, a zeolite comprises phosphated low silica to alumina ratio (SAR) zeolite. In at least one embodiment, at least 40%, at least about 45%, or at least about 50% of the aluminum remains substantially intact after phosphorus sta-bilization. In at least one embodiment, the low SAR zeolite is a zeolite with a SAR lower than about 30.

In at least one embodiment, the P/Al molar ratio of the phosphated template free beta zeolite is greater than about 0.2, greater than about 0.3, greater than about 0.5, or greater than about 0.7.

In at least one embodiment, the low SAR zeolite is a zeolite with a SAR lower than about 28, lower than about 25, lower than about 20, or lower than about 15.

In at least one embodiment, the zeolite is selected from zeolites with the structure BEA, MSE, -SVR, FAU, MOR, CON, SOF, MFI, IMF, FER, MWW, MTT, TON, EUO, MRE, NAT, CHA, or a combination thereof.

In at least one embodiment, the zeolite is beta zeolite.

In at least one embodiment, the zeolite is template free beta zeolite.

In at least one embodiment, the zeolite has an $Al_2O_3$ concentration of greater than about 8 wt %, greater than about 10 wt %, or greater than about 12 wt %, based on total weight of the zeolite.

In at least one embodiment, the phosphated low SAR zeolite is formed by a phosphorus source being condensed onto a partially dislodged tetrahedral framework aluminum ($Al_{Td}$) without complete framework de-alumination.

In at least one embodiment, the phosphorus source comprises phosphoric acid.

In at least one embodiment, the zeolite maintains at least about 70%, at least about 80%, or at least about 90% of its crystallinity after steaming.

In another aspect, a catalyst component comprises the zeolite of any one of the aforementioned embodiments and a non-zeolitic matrix.

In another aspect, an adsorbent comprises the zeolite of any one of the aforementioned embodiments and a substrate.

In another aspect, an ion exchange material comprises the zeolite of any one of the aforementioned embodiments.

In another aspect, a process for forming phosphated zeolite comprises: performing a phosphorus stabilization reaction of a phosphorus source onto a partially dislodged tetrahedral framework aluminum ($Al_{Td}$) of a zeolite. In at least one embodiment, the aluminum remains substantially intact.

In at least one embodiment, the phosphorus source comprises phosphoric acid.

In at least one embodiment, the performing the phosphorus stabilization reaction comprises titrating with phosphoric acid. In at least one embodiment, the titrating occurs at a rate effective to maintain a pH of about 2.2 to about 3.7, about 2.2 to about 3.5, about 2.2 to about 3.3, about 2.2 to about 3.0, about 2.25 to about 2.7, or about 2.3 to about 2.4.

In at least one embodiment, the zeolite is selected from zeolites with the structure BEA, MSE, -SVR, FAU, MOR, CON, SOF, MFI, IMF, FER, MWW, MTT, TON, EUO, MRE, NAT, CHA, or a combination thereof. In at least one embodiment, the zeolite is beta zeolite. In at least one embodiment, the zeolite is template free beta zeolite.

In at least one embodiment, the phosphorus stabilization reaction occurs for a duration sufficient to achieve a P/Al molar ratio of greater than about 0.2, greater than about 0.3, greater than about 0.5, or greater than about 0.7.

In at least one embodiment, the method further comprises calcining the zeolite, prior to the phosphorus stabilization reaction, to form a partially dislodged $Al_{Td}$ available for binding the phosphorus source thereto.

In at least one embodiment, calcining occurs at a temperature ranging from about 400° C. to about 650° C., from about 425° C. to about 625° C., from about 450° C. to about 625° C., or about 500° C. to about 600° C., from about 450° C. to about 600° C., or from about 450° C. to about 550° C.

In another aspect, a process for forming a catalyst component comprises combining the zeolite of any one of the aforementioned embodiments or the phosphated zeolite prepared by the process of any of the aforementioned embodiments and a non-zeolitic matrix.

In another aspect, a process for forming an adsorbent comprises combining the zeolite of any one of the aforementioned embodiments or the phosphated zeolite prepared by the process of any one of the aforementioned embodiments and a substrate.

In another aspect, a fluid catalytic cracking (FCC) additive composition comprises any of the aforementioned catalyst components.

In another aspect, a fluid catalytic cracking (FCC) catalyst composition comprising: a first component comprising any of the aforementioned catalyst components; and a second component that is compositionally different from the first component.

In at least one embodiment, the second component comprises a zeolite selected from zeolites with the structure BEA, MSE, -SVR, FAU, MOR, CON, SOF, MFI, IMF, FER, MWW, MTT, TON, EUO, MRE, NAT, CHA, or a combination thereof.

In at least one embodiment, the second component comprises zeolite Y.

In another aspect, a method of cracking a hydrocarbon feed comprises contacting said feed with the FCC catalyst composition of any one of the aforementioned embodiments.

In another aspect, fluid catalytic cracking (FCC) catalyst component comprises: the zeolite of any one of the aforementioned embodiments or the zeolite prepared by the process of any one of the aforementioned embodiments; a zeolite selected from zeolites with the structure BEA, MSE, -SVR, FAU, MOR, CON, SOF, MFI, IMF, FER, MWW, MTT, TON, EUO, MRE, NAT, CHA, or a combination thereof, and a non-zeolitic matrix.

In another aspect, a zeolite comprising phosphated zeolite having a SAR ranging from about 5 to about 150, the zeolite being prepared by a process comprising: performing condensation of a phosphorus source onto a partially dislodged tetrahedral framework aluminum ($Al_{Td}$) of a zeolite with substantially no de-alumination of the framework. In at least one embodiment, the P/Al molar ratio of the phosphated zeolite is greater than about 0.5. In at least one embodiment, the SAR ranges from 5 to 30, from 10 to 150, from 20 to 150, from 25 to 150, from 30 to 150, from 35 to 150, from 40 to 150, from 45 to 150, or from 50 to 150.

BRIEF DESCRIPTION OF THE DRAWINGS

The above and other features of the present disclosure, their nature, and various advantages will become more apparent upon consideration of the following detailed description, taken in conjunction with the accompanying drawings, in which:

FIG. 1A depicts the first step of a three step schematic illustrating a tetrahedral framework aluminum ($Al_{Td}$) in accordance with embodiments described herein;

FIG. 1B depicts the second step of the three step schematic illustrating a partially dislodged tetrahedral framework aluminum in accordance with embodiments described herein; and FIG. 1C depicts the third step of the three step schematic illustrating binding a phosphorus source onto the dislodged framework aluminum in accordance with embodiments described herein.

DEFINITIONS

As used herein, the singular forms "a," "an," and "the" include plural references unless the context clearly indicates otherwise. Thus, for example, reference to "a microsphere" includes a single microsphere as well as a mixture of two or more similar or different microspheres, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

As used herein, the term "catalyst" or "catalyst composition" or "catalyst material" "catalyst component" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

As used herein, the term "feed" or "feedstock" refers to that portion of crude oil that has a high boiling point and a high molecular weight. In FCC processes, a hydrocarbon feedstock is injected into the riser section of an FCC unit, where the feedstock is cracked into lighter, more valuable products upon contacting hot catalyst circulated to the riser-reactor from a catalyst regenerator.

As used herein, the terms "non-zeolitic component" or "matrix" or a "non-zeolitic matrix" refer to the components of an FCC catalyst that are not zeolites or molecular sieves. As used herein, the non-zeolitic component can comprise binder and filler.

As used herein, the term "zeolite" refers to a crystalline aluminosilicate with a framework based on an extensive three-dimensional network of silicon, aluminum and oxygen ions and have a substantially uniform pore distribution.

As used herein, the term "composition" or "catalyst composition" refers to a blend or a mixture of two or more separate and distinct components, such as a first component mixed or blended with a second component. In certain embodiments, the components in the composition are chemically combined and cannot be separated through physical means (e.g., filtration). In other embodiments, the components in the composition are not chemically combined and may be separated through physical means (e.g., filtration).

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

DETAILED DESCRIPTION

In various embodiments, the instant disclosure is directed to a zeolite including phosphated low silica to alumina ratio (SAR) zeolite, wherein at least about 40%, at least about 45%, at least about 50%, at least about 60%, at least about 70%, at least about 80%, or at least about 90% of the framework aluminum remains substantially intact and/or is not completely de-aluminated after phosphorus stabilization and/or after exposure to harsh conditions (such as low pH, high temperature and/or high moisture content). In certain embodiments, at least about 40%, at least about 45%, or at least about 50% of the framework aluminum remains substantially intact and/or is not completely de-aluminated after phosphorus stabilization but before steaming.

In certain embodiments, the present disclosure provides a zeolite including a phosphated low SAR zeolite in which the P/Al molar ratio ranges from about 0.2 to about 0.9. The term "low SAR zeolite," as used herein, refers to a zeolite with a SAR lower than about 30, lower than about 28, lower than about 25, lower than about 20, or lower than about 15.

In certain embodiments the methods and compositions described herein encompass zeolites having a SAR of 30 or greater, e.g., a SAR ranging from about 5 to about 150, about 10 to about 100, or about 15 to about 50, or any sub-range or single SAR value therein.

The term "substantially intact," as used herein, refers to at least two out four bonds in a tetrahedral framework aluminum remaining intact as Al—O—Si bonds, such that the aluminum remains chemically bound to the tetrahedral framework rather than completely de-aluminated or chemically detached from the tetrahedral framework. In certain embodiments, the amount of aluminum that remains chemically bound to the tetrahedral framework, after phosphorus stabilization, may be assessed from comparing the SAR of the zeolite after phosphorus stabilization to the SAR of the zeolite before phosphorus stabilization. If the method used to phosphorus stabilize the zeolite is too harsh, resulting in excessive hydrolysis of the Al—O—Si bonds and complete de-alumination, the aluminum content in the zeolite would decrease and the SAR of the zeolite after phosphorus stabilization will increase (when compared to the SAR of the zeolite before phosphorus stabilization). The methods described herein minimize the SAR increase of the zeolite upon phosphorus stabilization. In certain embodiments, the SAR of the zeolite after phosphorus stabilization (SAR-P) increases by up to about 20%, up to about 15%, up to about 10%, up to about 8%, or up to about 5%, as compared to the SAR of the zeolite before phosphorus stabilization (SAR-no P).

In certain embodiments, at least about 40%, at least about 45%, at least about 50%, at least about 60%, at least about 70%, at least about 80%, or at least about 90%, is not completely de-aluminated after phosphorus stabilization and/or after exposure to harsh conditions (such as high temperature and/or high moisture content). In certain embodiments, the aluminum that is not completely de-aluminated may be present in the zeolite as a combination of octahedral aluminum, tetrahedral aluminum, and phosphate stabilized tetrahedral aluminum. The zeolite sample may be characterized via, e.g., NMR, to establish the percentage of the various aluminum species.

A variety of zeolites may be stabilized or phosphated in accordance with the process described herein. Exemplary zeolites that can be suitably stabilized or phosphated, according to embodiments described herein, may be selected, without limitations, from zeolites with the structure BEA (e.g., beta zeolite), MSE, -SVR, FAU (e.g., zeolite Y), MOR, CON, SOF, MFI (e.g., ZSM-5), IMF, FER, MWW, MTT, TON, EUO, MRE, NAT, CHA, or a combination thereof. In certain embodiments, the zeolites may be template-free, which, as used herein, refers to the zeolite being formed without an organic structure directing agent. In one embodiment, the zeolite is a template free zeolite having the structure BEA, for example template free beta zeolite. In one embodiment, the zeolite has a structure FAU, for example Y zeolite. In one embodiment, the zeolite has a structure MFI, for example ZSM-5.

In certain embodiments, zeolites that may be stabilized or phosphated as described herein include, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-11 intermediates, ZSM-12, ZSM-22, ZSM-23, ZSM-35, ZSM-38, ZSM-48, ZSM-57 silicoalu-minophosphate SAPO-31 and (3) small pore zeolites (e.g., those having pore openings of less than about 4 Angstroms) such as, for example, erionite and ZSM-34.

In certain embodiments, zeolites that may be stabilized or phosphated as described herein include, without limitations, zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilolite, gme-linite, phillipsite and faujasite.

In certain embodiments, the zeolites described herein have an $Al_2O_3$ concentration of greater than about 4%, greater than about 8 wt %, greater than about 10 wt %, greater than about 12 wt %, greater than about 15 wt %, greater than about 20 wt %, or greater than about 25 wt %, based on total weight of the zeolite. In one embodiment, the zeolite is a template free beta zeolite with an $Al_2O_3$ concen-tration of greater than about 8 wt %, greater than about 10 wt %, greater than about 12 wt %, or greater than about 15 wt %, based on total weight of the zeolite. In certain embodiments, the $Al_2O_3$ concentration in the zeolites described herein is lower than 50 wt %, lower than 45 wt %, lower than 40 wt %, lower than 35 wt %, or lower than 30 wt %, based on total weight of the zeolite. The $Al_2O_3$ concentrations described herein may apply to a variety of zeolites that may be stabilized or phosphated according to embodiments described herein.

In certain embodiments, the zeolites described herein have an $P_2O_5$ concentration of greater than about 4 wt %, greater than about 5 wt %, greater than about 6 wt %, greater than about 7 wt %, greater than about 8 wt %, or greater than about 9 wt %, greater than about 10 wt %, greater than about 11 wt %, greater than about 12 wt %, greater than about 13 wt %, greater than about 14 wt %, or greater than about 15 wt %, based on total weight of the zeolite. In one embodi-ment, the zeolite is a template free beta zeolite with a $P_2O_5$ concentration of greater than about 4 wt %, greater than about 5 wt %, greater than about 6 wt %, greater than about 7 wt %, greater than about 8 wt %, or greater than about 9 wt %, greater than about 10 wt %, greater than about 11 wt %, greater than about 12 wt %, greater than about 13 wt %, greater than about 14 wt %, or greater than about 15 wt %, based on total weight of the zeolite. In certain embodiments, the $P_2O_5$ concentration in the zeolites described herein is lower than 30 wt %, lower than 25 wt %, lower than 20 wt %, lower than 19 wt %, lower than 18 wt %, lower than 17 wt %, lower than 16 wt %, or lower than 15 wt %, based on total weight of the zeolite. The $P_2O_5$ concentrations described herein may apply to a variety of zeolites that may be phosphate stabilized according to embodiments described herein.

In certain embodiments, the zeolites described herein have a P/Al molar ratio of the phosphated low SAR zeolite of greater than about 0.2, greater than about 0.3, greater than about 0.5, or greater than about 0.7. In one embodiment, the zeolite is a template free beta zeolite with a P/Al ratio of the template free beta zeolite of greater than about 0.2, greater than about 0.3, greater than about 0.5, or greater than about 0.7. For example, the P/Al molar ratio of the low SAR zeolites (e.g., template free beta zeolite) may range from about 0.2 to about 1, from about 0.5 to about 0.9, or from about 0.6 to about 0.8, or any sub-range or single P/Al molar ratio therein. In certain embodiments, similar P/Al molar ratios may be applicable for zeolites having a SAR of 30 or greater. The P/Al molar ratios described herein may apply to a variety of zeolites that may be phosphate stabilized accord-ing to embodiments described herein.

A zeolite with a low SAR, such as a template free beta zeolite, has a higher aluminum content which is believed to potentially correspond to a higher specific activity (since the active sites of a zeolite or believed to be on the framework aluminum). The term "specific activity," as used herein refers to the activity of the zeolite per zeolite surface area. It has been observed that the zeolite structure (e.g., structure of a template free beta zeolite) destabilizes upon exposure to steam. This is believed to occur due to rapid complete de-alumination (i.e., when the aluminum comes out of the zeolite framework) upon exposure of the zeolite to steam. Attempts have been made to stabilize zeolites through the inclusion of rare earth oxides and/or phosphorus.

Existing methods of incorporating phosphorus into a zeolite (e.g., incipient wetness, impregnation, slurrying phosphoric acid with zeolite, phosphoric acid spray drying, and so on) also tend to attack the zeolite framework by causing complete de-alumination of the framework alumi-num. For example, it is believed that a major portion of the aluminum in a low SAR zeolite (e.g., with SAR below 30) may completely de-aluminate at the low pH associated with existing phosphorus incorporation processes (e.g., phos-phoric acid spray drying process and the like). Furthermore, it is believed that existing phosphorus incorporation pro-cesses may only rarely result in the phosphorus bonding properly with the framework aluminum, so that the phos-phorus that is introduced in fact goes to the "wrong" place in or on the zeolite. Without being bound by theory, it is believed that part of the reason for this may be that the existing methods commonly evaporate the water from the phosphoric acid thereby concentrating it. This in turn results in polymerization of phosphoric acid to phosphate chains instead of binding to individual framework Al sites, thus leaving a corresponding number of framework Al sites unprotected.

In contrast to the above methods, the instant disclosure encompasses a method of incorporating phosphorus into a zeolite framework in a controlled and deliberate manner to stabilize the zeolite framework with substantially no com-plete de-alumination of the framework aluminum and no unnecessary phosphate polymerization, so that the phospho-rus is introduced into the "right" place on the zeolite. In certain embodiments, the phosphated low SAR zeolite is formed by a phosphorus source being condensed onto a partially dislodged tetrahedral framework aluminum ($Al_{Td}$) without unwanted complete de-alumination. Though the method is described with respect to low SAR zeolites, it may also be suitable for zeolites with SAR values that are higher than those described herein (e.g., SAR higher than 30) in some instances.

It has been identified that the process of framework bond breaking and complete de-alumination, also referred to as Si—O—Al bond hydrolysis, is kinetically fast at low pH, e.g., at a pH of about 2 (even at room temperature). Hence, the Si—O—Al bond hydrolysis is fast with existing methods phosphorus modification (incipient wetness, impregnation, slurrying phosphoric acid with zeolite, phosphoric acid spray drying, and so on), which contributes to the phospho-rus being introduced to the "wrong" place in or on the zeolite. In comparison to Si—O—Al bond hydrolysis, con-densation is a kinetically slow process. It was identified here that adding a phosphorus source (e.g., phosphoric acid) slowly (e.g., by titration) to a zeolite with partially dislodged tetrahedral framework aluminum ($Al_{Td}$) at a controlled temperature and at a controlled pH allows a condensation reaction to occur between the phosphorus source and the $Al_{Td}$ in a deliberate and controlled manner so that the phosphorus is introduce into the "right" place on the zeolite.

In one embodiment, the phosphorus source is phosphoric acid. Trying to incorporate phosphorus into a zeolite through the addition of phosphoric acid to the zeolite too quickly or in a large amount would significantly reduce the pH and cause unwanted complete de-alumination of the framework aluminum in the zeolite (i.e., encourage complete Si—O—Al bond hydrolysis). However, with the method described herein, the phosphoric acid is titrated onto the zeolite at a controlled pH and at a controlled temperature. Titrating the phosphoric acid in this manner apparently allows for a condensation reaction between the phosphoric acid and the zeolite to occur. Without being construed as limiting, it is believed that the condensation reaction that may occur between the phosphoric acid and the zeolite is as follows, where ≡ represents bonds to three framework oxygens:

$$H_3PO_4 + \equiv AlOH \rightarrow H_2PO_4 — Al \equiv + H_2O$$

Based on the above, it is believed that the products of the condensation reaction would be water and a solid acid (i.e., $H_2PO_4$—Al-BEA when a BEA zeolite structure is used) that is weaker than the reactants (i.e., weaker than phosphoric acid and H-BEA). Since the product is a weaker acid than the reactants, as the condensation reaction progresses, the pH will slowly rise, allowing for the addition of more phosphoric acid. The phosphoric acid may be continuously added at a controlled rate, controlled pH, and controlled temperature until a target phosphorus loading is achieved or until a P/Al molar ratio of about 0.3 to about 1.0, about 0.5 to about 0.9, or about 0.6 to about 0.8, or any sub-range or single P/Al molar ratio therein is achieved. A P/Al molar ratio closer to 1.0 being indicative that each framework aluminum has been phosphorus stabilized (i.e., 100% conversion in the reaction between framework aluminum and phosphoric acid), which is believed, without being construed as limiting, to be the contributing factor to maintaining the structure integrity of the zeolite at under extreme conditions (e.g., high temperature and moisture content).

In certain embodiments, the titrating with the phosphorus source (e.g., phosphoric acid) occurs at a rate effective to maintain a titration target pH of from about 2.2 to about 3.7, from about 2.2 to about 3.5, from about 2.2 to about 3.3, from about 2.2 to about 3.0, from about 2.25 to about 2.7, from about 2.3 to about 2.4, or any sub-range or single titration target pH therein. A lower pH was observed to expedite the condensation reaction (hence also increasing the P2O5 and P/Al content faster), however, a pH that is too low can result in unwanted complete de-alumination. A higher pH was observed to slow down the condensation reaction, however, the kinetics of the reaction can be accelerated by increasing the temperature. There is an optimal titration target pH range in which the condensation reaction occurs at an acceptable rate without causing unwanted complete de-alumination. In certain embodiments, there may be a combination of an optimal titration target pH and an optimal titration target temperature range, which together provide for a deliberate and controlled condensation reaction at an acceptable rate. It should be understood that occasional swings away from the titration target pH may occur during processing. Swings below the target pH (e.g., below 2.2) may be harmful as the low pH could cause unwanted complete de-alumination of the aluminum framework which could in turn de-stabilize the zeolite framework structure. However, swings above the target pH (e.g., above 3.0, above 3.3, above 3.5, or above 3.7) are not thought to be harmful in so far as they do not harm the stability of the zeolite. Though, as mentioned before, a higher pH may slow down the condensation reaction.

In certain embodiments, the titrating by the phosphorus source (e.g., phosphoric acid) occurs at a temperature ranging from about room temperature (e.g., about 25° C.) to about 150° C., from about 40° C. to about 120° C., from about 45° C. to about 100° C., or from about 50° C. to about 80° C., or any sub-range or single temperature value therein. While higher temperatures accelerate the kinetics of the condensation reaction, the temperature can be selected based on other parameters, such as, without limitations, selected titration pH range, the type of reactor used, the time available, the phosphorus source used, and so on. In effect, a higher slurry temperature can be used to compensate for a higher pH target that would otherwise slow down the condensation reaction.

As indicated above, the condensation of the phosphoric acid is induced on a partially dislodged tetrahedral framework aluminum ($Al_{Td}$). The term "partially dislodged tetrahedral framework aluminum" ($Al_{Td}$), as used herein, refers to at least one out four Al—O—Si bonds (but not more than three Al—O—Si bonds) in a tetrahedral framework aluminum being chemically detached or broken while the remaining Al—O—Si bonds remaining attached or intact, such that the aluminum remains partially chemically bound to the framework rather than completely chemically detached from the framework. In certain embodiments, the zeolite is calcined, prior to the condensation, to form a partially dislodged tetrahedral framework aluminum ($Al_{Td}$) available for binding the phosphorus source thereto. The calcining may occur at a temperature ranging from about 400° C. to about 650° C., from about 425° C. to about 625° C., from about 450° C. to about 625° C., from about 450° C. to about 600° C., from about 450° C. to about 550° C., or about 500° C. to about 600° C., or any sub-range or single calcining temperature value therein.

The process of inducing a partially dislodged tetrahedral framework aluminum ($Al_{Td}$) and grafting or binding phosphorus thereon is depicted in FIGS. 1A-1C (as drawn in van der Bij, H. E.; Weckhuysen, B. M. Phosphorus Promotion and Poisoning in Zeolite-Based Materials: Synthesis, Characterisation and Catalysis. Chem. Soc. Rev. 2015, 44, (20), 7406). FIG. 1A illustrates fully intact framework aluminum. Upon subjecting the fully intact framework aluminum to, e.g., thermal treatment (e.g., calcining as described above), a partially dislodged tetrahedral framework aluminum ($Al_{Td}$) forms, as shown in FIG. 1B. Other means may be utilized to form the partially dislodged tetrahedral framework aluminum ($Al_{Td}$) of FIG. 1B. The $Al_{Td}$ is substantially intact because it has three remaining Al—O—Si bonds. For instance, lower pH may also contribute to the formation of $Al_{Td}$, though a pH that is too low could break three or even all four bonds of the tetrahedral framework aluminum and completely remove the aluminum from the framework, which is referred to herein as unwanted complete de-alumination.

FIG. 1B-1C, adapted from van der Bij, illustrate that a phosphorus source, such as phosphoric acid, may be introduced, now via a slow process such as condensation, to deliberately and controllably bind the phosphorus onto the partially dislodged tetrahedral framework aluminum ($Al_{Td}$), e.g., to substitute the dislodged bond, as illustrated in FIG. 1C. While phosphoric acid is believed to have a suitable chemistry for the process depicted in FIGS. 1B-1C, other phosphorus sources or alternatively other compounds may be utilized to promote a similar chemical process that results in a stabilized substantially intact framework aluminum. The tetrahedral framework aluminum grafted or bound with a phosphorus source (such as phosphoric acid in FIG. 1C), stabilizes the zeolite structure by stabilizing the aluminum in the framework so that it does not completely de-aluminate during thermal treatment or other harsh conditions (such as spray drying, calcination, steaming or processing at high temperatures). It is important to note that the actual structure of the phosphated framework aluminum is not known, and that FIG. 1C is but one possibility, as noted by van der Bij. Further, the reaction to create the true species is not precisely known, and it is represented as a condensation reaction merely for convenience. Other reactions, such as a substitution reaction, are possibilities.

Zeolites obtained by the process described herein are believed to be stabilized such that the zeolite maintains at least about 70%, at least about 80%, or at least about 90% of its crystallinity after steaming, with the maximum being 100%. In certain embodiments, the percent crystallinity that is maintained may be assessed by comparing the zeolite surface area after steaming (SZSA) to the zeolite surface area before steaming (ZSA). For instance, in certain embodiments, the SZSA of the zeolites obtained by the process described herein is at least about 70%, at least about 80%, at least about 85%, at least about 90%, or at least about 95% of its ZSA (with the maximum being 100%).

The zeolites described herein have many applications, including, without limitations, as part of a catalyst component (e.g., for fluid catalytic cracking), as part of an adsorbent, or as part of an ion exchange material, to name a few.

In one embodiment, the instant disclosure encompasses a catalyst component that includes any of the zeolites described herein with a non-zeolitic matrix. The instant disclosure also contemplates a process for preparing a catalyst component by combining any of the zeolites described herein with a non-zeolitic matrix.

The non-zeolitic matrix in a catalyst component that includes any of the zeolites described herein may include, without limitations, clay, rare earth-doped alumina (e.g., selected from one or more of ytterbium-doped alumina, gadolinium-doped alumina, cerium-doped alumina, or lanthanum-doped alumina), $SiO_2$—$Al_2O_3$ matrix, silica-doped alumina, gamma-alumina, $\chi$-alumina, $\delta$-alumina, $\theta$-alumina, $\kappa$-alumina, boehmite, mullite, spinel, kaolinite, halloysite, montmorillonite, bentonite, attapulgite, kaolin, amorphous kaolin, metakaolin, hydrous kaolin, gibbsite (alumina trihydrate), titania, alumina, silica, silica-alumina, silica-magnesia, magnesia, sepiolite, or mixtures of two or more thereof.

Any of the zeolites described herein may be included in a catalyst component at an amount of at least 0.1 wt %, at least about 0.3 wt %, at least about 0.5 wt %, at least about 0.7 wt %, at least about 1 wt %, at least about 1.5 wt %, at least about 2 wt %, at least about 2.5 wt %, at least about 3 wt %, at least about 3.5 wt %, at least about 4 wt %, at least about 4.5 wt %, at least about 5 wt %, at least about 6 wt %, at least about 7 wt %, at least about 8 wt %, at least about 9 wt %, at least about 10 wt %, at least about 15 wt %, at least about 20 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, or at least about 80 wt %, based on total weight of the catalyst component.

In certain embodiments, any of the zeolites described herein may be included in a catalyst component in an amount of up to about 40 wt %, up to about 35 wt %, up to about 30 wt %, up to about 25 wt %, up to about 20 wt %, up to about 15 wt %, up to about 10 wt %, up to about 9 wt %, up to about 8 wt %, up to about 7 wt %, up to about 6 wt %, up to about 5 wt %, up to about 4.5 wt %, up to about 4 wt %, up to about 3.5 wt %, up to about 3 wt %, up to about 2.5 wt %, up to about 2 wt %, up to about 1.5 wt %, up to about 1 wt %, up to about 0.8 wt %, up to about 0.5 wt %, up to about 0.3 wt %, based on total weight of the catalyst component.

In certain embodiments, any of the phosphate stabilized zeolites described herein may be combined in a single catalyst component with one or more additional zeolites (e.g., a phosphate stabilized beta and/or a phosphate stabilized ZSM-5 may be combined with a Y zeolite). Existing catalyst components (e.g., incorporated catalyst components) tend to minimize or omit phosphorus because it is believed that the phosphorus could migrate within the catalyst component and poison (or adversely affect) constituents within the catalyst component (e.g., other zeolitic constituents or non-zeolitic matrix constituents). Without being construed as limiting, it is believed that the phosphate stabilized zeolites, as described herein, bind the phosphorus in such a deliberate and controlled manner that the phosphorus will remain bound to the zeolite rather than detach and/or migrate to other constituents within the catalyst component. Hence, it is believed, that the phosphate stabilized zeolites described herein may be combined in a single catalyst component with other constituents, that would otherwise be sensitive to phosphorus, without poisoning or adversely affecting such constituents.

The one or more additional zeolites (that can be combined in a single catalyst component with the phosphate stabilized zeolites described herein) may be selected from zeolites with the structure BEA (e.g., beta zeolite), MSE, -SVR, FAU (e.g., zeolite Y), MOR, CON, SOF, MFI (e.g., ZSM-5), IMF, FER, MWW, MTT, TON, EUO, MRE, NAT, CHA, or a combination thereof. In certain embodiments, the one or more additional zeolites (that can be combined in a single catalyst component with the phosphate stabilized zeolites described herein) include, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41, REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34. In certain embodiments, the one or more additional zeolites (that can be combined in a single catalyst component with the phosphate stabilized zeolites described herein) include, without limitations, zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilolite, gmelinite, phillipsite and faujasite.

In certain embodiments, a catalyst component that includes any of the zeolites described herein may be a first catalyst component in a catalyst composition that includes at least a second catalyst component (and optionally additional catalyst component(s)). The first catalyst component and the second catalyst component (and any additional catalyst component(s), if included) may be mixed, blended, or combined together to form the final catalyst composition. The final catalyst composition may be used for fluid catalytic cracking (FCC). In certain embodiments, the catalyst component may be, or be included as part of an FCC additive composition.

The second catalyst component may be compositionally different from the first catalyst component. Similarly, any additional catalyst component(s), if included, may be compositionally different from the first catalyst component and from the second catalyst component.

In certain embodiments, the second catalyst component and/or any additional catalyst component(s) may include zeolites with the structure BEA (e.g., beta zeolite), MSE, -SVR, FAU (e.g., zeolite Y), MOR, CON, SOF, MFI (e.g., ZSM-5), IMF, FER, MWW, MTT, TON, EUO, MRE, NAT, CHA, or a combination thereof.

In certain embodiments, the second catalyst component and/or any additional catalyst component(s) may include (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34.

In certain embodiments, the second catalyst component and/or any additional catalyst component(s) may include zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilolite, gmelinite, phillipsite and faujasite.

Hydrothermally and/or chemically modified versions of many of the components described herein may also be suitable as the at least one additional component in the FCC catalyst compositions contemplated herein.

The instant disclosure also encompasses methods of using the catalyst component by itself, as part of an FCC catalyst composition, or as part of an FCC additive composition, to crack a hydrocarbon feed. The methods include contacting said hydrocarbon feed with any of the catalyst components described herein or with any of the FCC catalyst compositions described herein or with any of the FCC additive compositions described herein.

In one embodiment, the instant disclosure encompasses an adsorbent that includes any of the zeolites described herein and a substrate. In one embodiment, the instant disclosure encompasses an ion exchange material that includes any of the zeolites described herein. Any of the zeolites described herein may be combined with a suitable substrate or any other suitable constituent, as understood by those skilled in the art, in order to form an adsorbent or an ion exchange material.

ILLUSTRATIVE EXAMPLES

The following examples are set forth to assist in understanding the disclosure and should not be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

Example 1: Improved Activity Through P Condensation

The activity of a catalyst component including templated beta zeolite (with and without phosphate) was compared to that of catalyst components including template free beta zeolite (with phosphate). The compositions of the various catalyst components are summarized in Table 1 below. The catalyst components that include P preloaded were prepared by utilizing a pre-milled zeolite with a phosphorus source subsequently condensed thereon, according to embodiments described herein. After phosphorus condensation, the zeolites were mixed with kaolin, peptized boehmite, and additional phosphoric acid sufficient to reach an overall stoichiometry of P/Al molar ratio equal to about 1.0. For calculation purposes, boehmite and zeolite are included in that stoichiometry, but kaolin is not.

The following is a description of an exemplary method for condensing phosphorus onto the zeolites that were incorporated into the catalyst components exemplified herein. About 1 kg (dry basis) of milled zeolite was formulated as a 20% solids slurry at about 25 to 95° C. and the pH of the slurry was recorded. The slurry was titrated with phosphoric acid at a pH of about 2.2 to about 3.7 and a temperature of about 25° C. to about 100° C. Phosphoric acid was continuously added (i.e., titrated) until saturated at a target pH within the range of about 2.2 to about 3.7 and at a target temperature within the range of about 25° C. to about 100° C. Thereafter, an aliquot of the zeolite slurry (with the phosphorus grafted onto the zeolite framework) was filtered and washed with water at a temperature within the range of about 25° C. to about 100° C. The zeolite was dried and optionally calcined for analysis. The properties of the zeolite (e.g., $Al_2O_3$ content, P2O5 content, SiO2 content, Na2O content, ZSA, SAR before and after P condensation) were characterized after calcination at 704° C. The methods described herein maximize phosphorus uptake and maximize the resulting P/Al molar ratio while minimizing (and in some instances eliminating) bulk de-alumination. These methods result in a phosphorus stabilized zeolite (e.g., phosphorus stabilized beta zeolite) that is also protected from further complete de-alumination during processing under harsh conditions (such as low pH, high temperatures and high moisture content).

The main portion of the condensation product slurry was mixed with kaolin, peptized boehmite slurry and phosphoric acid and then spray dried to form microspheres of a first component. The air jet attrition rate, zeolite surface area (ZSA), and steamed zeolite surface area (SZSA) for the various catalyst components, after spray drying, are summarized in Table 2 below. The performance (in terms of activity and specific activity) for the various catalyst components, after spray drying, are summarized in Table 3 below. The performance of the catalyst components was assessed using ACE® fluid bed cracking methodologies discussed in further detail below the results.

TABLE 1

| Catalyst Components Compositions | | | | | | | | | |
|---|---|---|---|---|---|---|---|---|---|
| Zeolite (SAR, | SAR | P/Al | | | | | Composition Estimate from XRF | | |
| no P) | with P | Preload | SiO2 | Al2O3 | Na2O | P2O5 | Clay | Boehmite | Beta wt %* |
| Beta A (38) | — | 0.00 | 58.3 | 26.9 | 0.16 | 12.0 | 43.5 | 6.4 | 38.2 |
| P-Beta A (38) | 48 | 0.34 | 59.3 | 26.7 | 0.14 | 11.7 | 42.3 | 6.7 | 39.3 |
| P-Beta B (9.2) | 10.1 | 0.73 | 54.2 | 27.6 | 0.17 | 16.1 | 37.1 | 5.2 | 41.7 |
| P-Beta C (9.6) | 11.4 | 0.84 | 50.9 | 29.8 | 0.14 | 16.9 | 41.5 | 6.6 | 35.1 |
| P-Beta D (9.2) | 9.7 | 0.67 | 53.0 | 27.9 | 0.15 | 16.3 | 35.8 | 5.9 | 42.0 |

*Beta loading target was set to 40 wt % on SiO2 + Al2O3 basis. Excludes pre-loaded P2O5.

TABLE 2

| AJAR and Surface Area of Catalyst Components | | | | | | | | | |
|---|---|---|---|---|---|---|---|---|---|
| Zeolite (SAR, no P) | SAR with P | P/Al Preload | P2O5 | First Component P/Al | Beta wt %* | AJAR | ZSA | SZSA | % SZSA |
| Beta A (38) | 38 | 0.00 | 12.0 | 1.07 | 38.2 | 2.4 | 140 | 129 | 92% |
| P-Beta A (38) | 48 | 0.34 | 11.7 | 1.00 | 39.3 | 2.4 | 146 | 130 | 89% |
| P-Beta B (9.2) | 10.1 | 0.73 | 16.1 | 1.00 | 41.7 | 4.1 | 122 | 111 | 91% |
| P-Beta C (9.6) | 11.4 | 0.84 | 16.9 | 1.02 | 35.1 | 2.0 | 96 | 91 | 95% |
| P-Beta D (9.2) | 9.7 | 0.67 | 16.3 | 0.94 | 42.0 | 4.6 | 92 | 78 | 85% |

TABLE 3

| Performance of Catalyst Components | | |
|---|---|---|
| Zeolite | Activity | Activity/SZSA |
| Beta A (38) | 100% | 100% |
| P-Beta A (38) | 117% | 117% |
| P-Beta B (9.2) | 116% | 135% |
| P-Beta C (9.6) | 125% | 177% |
| P-Beta D (9.2) | 106% | 175% |

As can be seen from Table 1, P condensation onto templated Beta A at certain conditions resulted in de-alumination (by bulk chemical analysis) from SAR 38 to SAR 48 after washing, so the conditions used were some-what too severe, but 7900 of the original framework alumi-num remains in the bulk sample after washing. In the case of Beta C, bulk analysis SAR was increased from 9.6 to 11.4 after washing, but 8400 of the original framework Al remains in the bulk sample. For Betas B and D, bulk de-alumination was more limited. In general, it was found that increasing the pH of condensation reduced bulk de-alumination, but also reduced the rate and extent of con-densation.

Analysis by 27Al NMR has shown that even when bulk de-alumination is minimal, substantial conversion to octa-hedral aluminum can occur.

As can be seen from Table 3, phosphorus condensation, in accordance with embodiments described herein, increased the activity of Beta A (38) (having a SAR of 38 before condensation) by 17%, when compared to the activity of Beta A without phosphorus condensation, despite its de-alumination from SAR 38 to SAR 48.

Table 3 also illustrates that the specific activity (activity per steamed ZSA) for template free beta with phosphorus condensed thereon, in accordance with embodiments described herein, is higher than the specific activity of templated beta without condensed phosphorus (by 35 to 75% higher) and higher than the specific activity of template beta with condensed phosphorus (by 18 to 60% higher).

A second set of samples were spray dried. The spray drying employed the same "Beta D" starting zeolite from the prior examples, which activity was about equivalent to the control 37 SAR Beta A in those examples. The purpose of the new set of examples was to clearly demonstrate the benefits of condensation over impregnation of H3PO4, or over performing no pretreatment of the template-free beta zeolite (Ex. A). Condensations were carried out at 70° C. and 20% solids, titrating to the pH target and holding for 40 minutes. Typically, acid addition can be relatively fast initially and pH values can drop below target. Acid uptakes generally taper off after 5 about minutes. Spray drying was conducted later by blending constituent slurries at ambient temperature to give about 20% solids, with the analyzed compositions given in Table 4 below.

The results in Table 4 show that, while pre-impregnation followed by post-calcination at 450° C. provides some SZSA benefit versus no pretreatment (49 vs. 30 m²/g; F vs. A), condensation to 0.67 P/Al increases SZSA a further 20% without post-calcination (Ex. B), and 80% with post-calci-nation at 550° C. (Ex. C). Equivalent SZSA was obtained when the condensation to 0.67 P/Al was split into two passes with an intermediate calcination at 550° C. (Ex. D). Reducing the overall P/Al in the bound catalyst also appeared to improve zeolite crystallinity (Ex. E), but the fresh ZSA benefit was not retained in steaming. It can be stated that most of the samples should provide more than 130 m²/g of ZSA, were it not for the damaging effects of slurrying the alumina-rich beta zeolite with $H_3PO_4$ at spray drying. NMR has shown that post calcination or steaming can induce or increase the presence of 38 ppm tetrahedrally coordinated framework $Al_T$—O—P.

ACE Methodologies

Standard method: ACE (see U.S. Pat. No. 6,069,012) results over a range of conversions may be obtained by a constant time on stream protocol using vacuum gasoil at a cracking temperature of 1020° F. and an injector height of 2.125", as described in U.S. Pat. No. 6,656, 347 B2 and later modified by Ind. Engr. Chem. (54) 5921.

TABLE 4

| Condensation Versus Impregnation | | | | | | | |
|---|---|---|---|---|---|---|---|
| | Example | | | | | | |
| | A | B | C | D | E | F | Control |
| Phosphating beta | | | | | | | |
| # Condensations | 0 | 1 | 1 | 2 | 1 | Impregnated | 0 |
| pH of condensation(s) | — | 2.35 | 2.35 | 2.5, 2.35 | 2.35 | not measured | — |
| Post-Calcined | — | — | 550 | 550 | 550 | 450 | — |
| SAR (no P) | 9.2 | 9.2 | 9.2 | 9.2 | 9.2 | 9.2 | 37 |
| SAR with P | 9.53 | 9.55 | 9.57 | 9.8 | 9.65 | 9.62 | |
| P/Al Preload | — | 0.67 | 0.68 | 0.67 | 0.69 | 0.75 | — |
| 1$^{st}$ component | | | | | | | |
| SiO₂ | 52.7 | 52.7 | 52.5 | 52.9 | 54.2 | 52.6 | |
| Al₂O₃ | 28.7 | 28.5 | 28.7 | 28.5 | 29.8 | 28.4 | |
| P₂O₅ | 17 | 17.1 | 17.2 | 17.1 | 14.1 | 17 | 12 |
| Na₂O | 0.15 | 0.15 | 0.14 | 0.13 | 0.14 | 0.15 | |
| Clay (from XRF) | 39.2 | 36.5 | 35.8 | 35.4 | 38.9 | 36.1 | |
| Boehmite (from XRF) | 6 | 6.7 | 7.2 | 7 | 6.9 | 6.7 | |
| Beta wt % (from XRF) | 37.9 | 39.7 | 39.8 | 40.5 | 40.2 | 40.2 | 38 |
| First Component P/Al | 1.04 | 0.96 | 0.94 | 0.94 | 0.78 | 0.96 | 1.07 |
| ZSA | 47 | 77 | 98 | 104 | 115 | 66 | 140 |
| SZSA | 30 | 59 | 88 | 87 | 88 | 49 | 129 |
| % SZSA | 64 | 77 | 90 | 84 | 76 | 74 | 92 |
| Activity | 61% | 78% | 96% | 110% | 106% | 76% | 100% |
| Activity/SZSA | 264% | 171% | 141% | 162% | 155% | 199% | 100% |

The sample performance was evaluated by ACE fixed fluid bed cracking as before by replacing a portion of inert microspheres in an otherwise constant FCC catalyst composition. All components were steam-deactivated at 1500° F. in 100% steam for four hours. It is now seen that the method used to produce Ex. F (impregnation) resulted in a template-free component having less butylenes activity than a high SAR beta zeolite without condensation. Among the condensation samples, activity is increased by 26% by post-calcination, 41% by splitting into two passes, and perhaps 9% by reducing total P/Al on the spray dried component below 1.0, as compared to condensation alone. Condensation also provides 31% higher activity than impregnation when both cases are post-calcined.

The provided activity by these examples is useful in commercial operations, and the compositions can be preferred for the absence of the expense of zeolite growth template. The activity results further demonstrate that the template-free phosphated beta of the invention can have activity at least equivalent to a high SAR prior art control, despite the fact that their SZSA can be about ⅓ lower. Equivalently, specific activity is 50% or more higher, owing to the stabilization of a higher concentration of framework aluminum. Without the preparative methods of the embodiments described herein, said higher concentration of framework aluminum merely leads to unwanted dealumination on exposure to $H_3PO_4$ at spray drying, or to steam during catalyst aging, either of which results in a loss of crystallinity and/or activity.

Deactivation: All components were steam-deactivated at 1500 F. for four hours in 100% steam before measurement of the SZSA or evaluation in the ACE reactor.

Additive doping: Common additives such as ZSM-5 can be assessed by running cracks at constant base catalyst/oil ratio, but with increasing levels of additives doped in, and measuring the resulting incremental yields of butylenes and propylene. To keep bed height, contact time, fluidization and endotherms constant, additives replace an equivalent amount of clay microsphere diluent. The total grams of solids in the reactor is thus constant.

Activity and selectivity of additives: The activity and selectivity of additives is readily assessed during doping experiments. From the slope of the butylenes vs dose plot, we interpolate the dosage required to obtain a targeted wt % of incremental butylenes. The additive activity is proportional to said slope or the reciprocal of said dosage. The butylene vs propylene selectivity is the ratio of the two slopes.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present disclosure has been described with reference to specific exemplary embodiments thereof. The specification and drawings are, accordingly, to be regarded in an illustrative rather than a restrictive sense. Various modifications of the disclosure in addition to those shown and described herein will become apparent to those skilled in the art and are intended to fall within the scope of the appended claims.

What is claimed is:

1. A zeolite comprising phosphated low silica to alumina ratio (SAR) zeolite, wherein at least 40% of the aluminum remains substantially intact after phosphorus stabilization, wherein the zeolite is template free beta zeolite having an $Al_2O_3$ concentration of greater than about 8 wt %, based on total weight of the zeolite, and wherein the low SAR zeolite is a zeolite with a SAR lower than about 30.

2. The zeolite of claim 1, wherein the P/Al molar ratio of the phosphated low SAR zeolite is greater than about 0.2.

3. The zeolite of claim 1, wherein the low SAR zeolite is a zeolite with a SAR lower than about 28.

4. The zeolite claim 1, wherein the phosphated low SAR beta zeolite is formed by a phosphorus source being condensed onto a partially dislodged tetrahedral framework aluminum ($Al_{Td}$) without complete framework de-alumination, and wherein the phosphorus source comprises phosphoric acid.

5. The zeolite of claim 1, wherein the zeolite maintains at least about 70% of its crystallinity after steaming.

6. An ion exchange material comprising the zeolite of claim 1.

7. The zeolite of claim 1, wherein the zeolite is prepared by a process comprising:

performing condensation of a phosphorus source onto a partially dislodged tetrahedral framework aluminum ($Al_{Td}$) of a template free beta zeolite with substantially no de-alumination of the framework.

8. A catalyst component comprising phosphated low silica to alumina ratio (SAR) zeolite, wherein at least 40% of the aluminum remains substantially intact after phosphorus stabilization, and wherein the low SAR zeolite is a zeolite with a SAR lower than about 30, and a non-zeolitic matrix.

9. The catalyst component of claim 8, wherein the zeolite is template free beta zeolite having an $Al_2O_3$ concentration of greater than about 8 wt %, based on total weight of the zeolite.

10. An adsorbent comprising zeolite comprising phosphated low silica to alumina ratio (SAR) zeolite, wherein at least 40% of the aluminum remains substantially intact after phosphorus stabilization, and wherein the low SAR zeolite is a zeolite with a SAR lower than about 30, and a substrate.

11. A process for forming phosphated zeolite, comprising:

performing a phosphorus stabilization reaction of a phosphorus source onto a partially dislodged tetrahedral framework aluminum ($Al_{Td}$) of a zeolite, wherein the aluminum remains substantially intact, and wherein the zeolite is template free beta zeolite.

12. The process of claim 11, wherein the phosphorus source comprises phosphoric acid.

13. The process of claim 11, wherein the performing the phosphorus stabilization reaction comprises titrating with phosphoric acid.

14. The process of claim 13, wherein the titrating occurs at a rate effective to maintain a pH of about 2.2 to about 3.7.

15. The process of claim 11, wherein the phosphorus stabilization reaction occurs for a duration sufficient to achieve a P/Al molar ratio of greater than about 0.2.

16. The process of claim 11, further comprising calcining the zeolite, prior to the phosphorus stabilization reaction, to form a partially dislodged $Al_{Td}$ available for binding the phosphorus source thereto.

17. The process of claim 16, wherein calcining occurs at a temperature ranging from about 400° C. to about 650° C.

* * * * *